US012488006B2

(12) United States Patent
Pandey et al.

(10) Patent No.: US 12,488,006 B2
(45) Date of Patent: Dec. 2, 2025

(54) DEMOCRATIZED DATA PROFILING AND VALIDATION

(71) Applicant: American Express Travel Related Services Company, Inc., New York, NY (US)

(72) Inventors: Ajeet Kumar Pandey, Gurgaon (IN); Ashish Sehgal, New Delhi (IN); Sumit Sodhi, New Delhi (IN); Pooja Bajaj Malhotra, Gurgaon (IN); Achut Perumbala, Phoenix, AZ (US); Vinay Dhingra, Gurgaon (IN); Purvi Shailesh Shah, East Brunswick, NJ (US); Phanikalyan Cherukuri, Chandler, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 18/510,030

(22) Filed: Nov. 15, 2023

(65) Prior Publication Data
US 2024/0362233 A1 Oct. 31, 2024

(30) Foreign Application Priority Data

Apr. 28, 2023 (IN) .............................. 202341030618

(51) Int. Cl.
*G06F 16/2457* (2019.01)
*G06F 16/22* (2019.01)
*G06F 16/2455* (2019.01)

(52) U.S. Cl.
CPC .... *G06F 16/24573* (2019.01); *G06F 16/2282* (2019.01); *G06F 16/24564* (2019.01)

(58) Field of Classification Search
None
See application file for complete search history.

(56) References Cited

U.S. PATENT DOCUMENTS

| | | | | |
|---|---|---|---|---|
| 7,509,343 | B1 * | 3/2009 | Washburn | G06F 11/3433 |
| 7,680,759 | B1 * | 3/2010 | Coley | G06F 16/24 |
| | | | | 707/999.001 |
| 8,812,448 | B1 * | 8/2014 | Anderson | G06F 3/0647 |
| | | | | 707/610 |
| 10,963,435 | B1 * | 3/2021 | McAlister | G06F 11/0766 |
| 11,093,477 | B1 * | 8/2021 | Martin | G06F 16/2322 |
| 2003/0200182 | A1 * | 10/2003 | Truitt | G06Q 20/16 |
| | | | | 705/75 |
| 2007/0174234 | A1 * | 7/2007 | Ramsey | G06F 16/217 |
| 2014/0207706 | A1 * | 7/2014 | Sitaram | G06Q 40/02 |
| | | | | 705/36 R |
| 2014/0279830 | A1 * | 9/2014 | Majumdar | G06F 16/283 |
| | | | | 707/602 |

(Continued)

*Primary Examiner* — Christopher J Raab
(74) *Attorney, Agent, or Firm* — Thomas Horstemeyer, LLP

(57) ABSTRACT

Disclosed are various approaches performing distributed profiling and validation. A query is generated for profile data for data stored in a data warehouse. Then, the query for the profile data is sent to the data warehouse. The profile data is then received from the data warehouse. Later, in response to a request to load the data stored in the data warehouse into a table in a data store, a determination is made as to whether the data stored in the data warehouse complies with a validation rule.

20 Claims, 7 Drawing Sheets

(56) References Cited

U.S. PATENT DOCUMENTS

| | | | |
|---|---|---|---|
| 2014/0317153 A1* | 10/2014 | Chen | G06F 16/284 |
| | | | 707/804 |
| 2015/0278386 A1* | 10/2015 | Jain | G06F 16/83 |
| | | | 715/234 |
| 2015/0310076 A1* | 10/2015 | Rambo | G06F 16/2379 |
| | | | 707/602 |
| 2016/0088014 A1* | 3/2016 | Chandran | H04L 63/1458 |
| | | | 726/23 |
| 2017/0116208 A1* | 4/2017 | Blake | G06F 16/25 |
| 2019/0130020 A1* | 5/2019 | Helms | G06F 16/288 |
| 2020/0210389 A1* | 7/2020 | Swami | G06F 16/215 |
| 2021/0149851 A1* | 5/2021 | Belezko | G06F 16/9024 |
| 2022/0179824 A1* | 6/2022 | Schmitt | G06F 3/0653 |
| 2022/0188324 A1* | 6/2022 | Ramesh | G06F 16/254 |
| 2023/0169053 A1* | 6/2023 | Anderson | G06F 16/2365 |
| | | | 707/812 |
| 2024/0264986 A1* | 8/2024 | Liu | G06F 16/215 |

* cited by examiner

User Interface 156a http://dataprocessingservice.example.com/create/...

Please Create Rule

| Table | Column | Criterion | Match | Value |
|---|---|---|---|---|
| ▼ | | | ▼ | 97% |
| Table_1 | | | | |
| Table_2 | | | | |
| Table_3 | | | | |
| Table_4 | | | | |

Save   Cancel

FIG. 5A

User Interface 156b http://dataprocessingservice.example.com/create/...

Please Create Rule

| Table | Column | Criterion | Match | Value |
|---|---|---|---|---|
| Table_1 | ▼ | | ▼ | 97% |
| | Col_1 | | | |
| | Col_2 | | | |
| | Col_3 | | | |
| | Col_4 | | | |

Save   Cancel

User Interface 156e http://dataprocessingservice.example.com/create/...

Please Create Custom Rule

Table

| Table_1 |
| Table_2 |
| Table_3 |
| Table_4 |

Save    Cancel

FIG. 6A

User Interface 156f http://dataprocessingservice.example.com/create/...

Please Create Custom Rule

Table

Table_3

Custom Expression

Save    Cancel

FIG. 6B

DEMOCRATIZED DATA PROFILING AND VALIDATION

CROSS-REFERENCE TO RELATED APPLICATIONS

This application claims priority to, and the benefit of, copending Indian Provisional Patent Application 20/234, 1030618, titled "DEMOCRATIZED DATA PROFILING AND VALIDATION" and filed on Apr. 28, 2023, which is incorporated by reference as if set forth herein in its entirety.

BACKGROUND

The same set of data can be used by an organization for different purposes. For example, the same customer database could be used for mailing out marketing or promotional materials and for mailing out legally required notifications to customers. The two different use cases may have different data validation requirements. For example, a certain percentage of customer records with incomplete or erroneous contact information may be acceptable when mailing out marketing or promotional materials, but unacceptable when mailing out legally required customer notifications.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 5A-5D are pictorial diagrams of an example user interface presented by a client device in the network environment of FIG. 1 according to various embodiments of the present disclosure.

FIG. 6A and FIG. 6B are pictorial diagrams of an example user interface presented by a client device in the network environment of FIG. 1 according to various embodiments of the present disclosure.

DETAILED DESCRIPTION

Disclosed are various approaches for validating that data is fit for its intended purpose in a computationally efficient manner by using distributed processes at the data source level. A profile command or query can be sent to the source database that is storing or warehousing the data to be used. The database can then profile the data to determine statistics such as the minimum value, mean value, maximum value, mode value, variance, fill rate, etc. The profile can then be used to evaluate whether the data satisfies one or more criteria for use. If the data satisfies the criteria for use, then it can be loaded into a table for use by a requesting application or user. However, if the data fails to satisfy the criteria, an alert can be sent to predefined or specified user, thereby avoiding the use of network bandwidth or database storage for data that is not fit for purpose. Moreover, by pushing the profiling to the database that is storing or warehousing the data, multiple data sets can be profiled in parallel by multiple databases, increasing throughput of the profiling operation.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
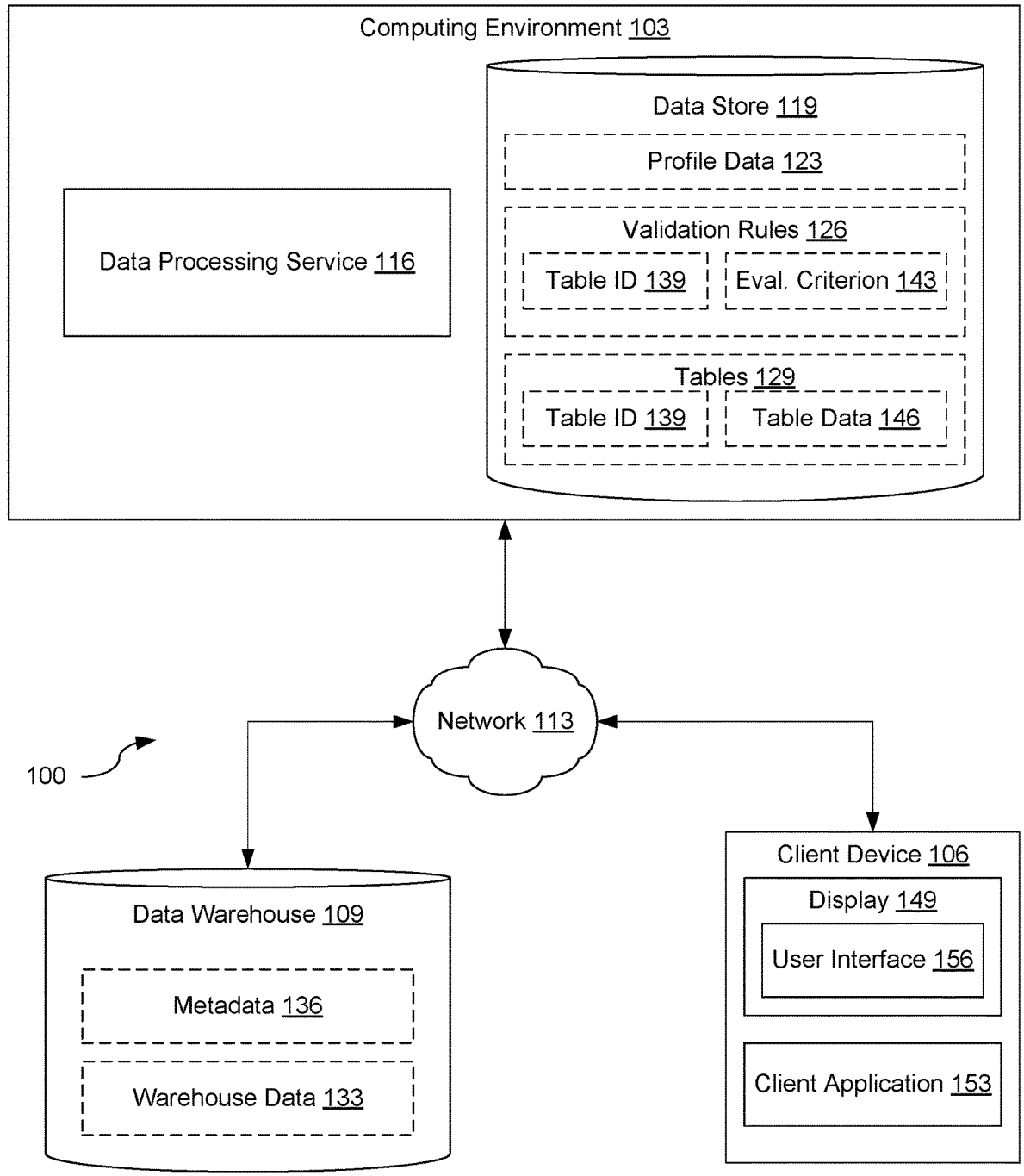
FIG. 1 is a drawing of a network environment according to various embodiments of the present disclosure.

With reference to FIG. 1, shown is a network environment 100 according to various embodiments. The network environment 100 can include a computing environment 103, a client device 106, and a data warehouse 109, which can be in data communication with each other via a network 113. Although depicted and described separately, the data warehouse 109 could be included in or operate as a component of the computing environment 103 in various embodiments of the present disclosure.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a data processing service 116, and other applications, services, processes, systems, engines, or functionality not discussed in detail herein.

Also, various data is stored in a data store 119 that is accessible to the computing environment 103. The data store 119 can be representative of a plurality of data stores 119, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 119 is associated with the operation of the various applications or functional entities described below. This data can include profile data 123, one or more validation rules 126, one or more tables 129, and potentially other data.

The data warehouse 109 can represent any repository or other system for storing current and/or historical data from a variety of systems, services, and processes in a centralized repository for subsequent analysis. A data warehouse 109 can include one or more relational databases or non-relational databases such as object-oriented databases, hierarchical databases, hash tables or similar key-value data stores, as well as other data storage applications or data structures hosted by one or more computing devices. Data stored in the data warehouse can include warehouse data 133 and associated metadata 136.

The profile data 123 can represent statistical information about the warehouse data 133 stored in the data warehouse 109. The profile data 123 can be generated based at least in part on an analysis of the warehouse data 133 in the data warehouse 109 and the associated metadata 136. Examples of profile data 123 can include the fill rate for a column in the warehouse data 133 (e.g., how many rows in a column contain a data versus a null entry), the minimum value of a column, the maximum value of a column, the mean value of a column, the median value of a column, the mode value of a column, the variance or standard deviation of values within a column, etc.

The validation rules 126 can represent one or more rules that can be evaluated when warehouse data 133 is to be loaded from the data warehouse 109 into a table 129. Because different tables could be used for different purposes, a validation rule 126 could be created to determine whether warehouse data 133 from the data warehouse 109 is fit for the purpose of the table 129. Therefore, validation rules 126 can be table 129 specific, although duplicate validation rules 126 could be used for different tables 129. Accordingly, a validation rule 126 could include the table identifier 139 of the table 129 that the validation rule 126 is to be used for evaluation purposes. A validation rule 126 could also include one or more evaluation criteria 143 that could be evaluated or analyzed to determine whether warehouse data 133 complies with the validation rule 126 and is therefore fit for the purposes of the table 129 associated with the validation rule 126.

Each evaluation criterion 143 could specify a requirement for data to be stored in a column of the table 129. For example, an evaluation criterion 143 could specify that values in a column of data the table 129 must have a minimum fill rate. As another example, an evaluation criterion 143 could specify that a minimum, maximum or average value in a column of the table 129. As another example, an evaluation criterion 143 could specify that a minimum or maximum percentage of values in a column of the table 129 be within or outside of a specified number of standard deviations. Other requirements could also be specified based on the metadata 136 of the warehouse data 133 stored in the data warehouse 109, the properties of the table 129, or the available profile data 123.

The tables 129 can represent data used by various applications or data analysts for various purposes. Each table 129 can include a table identifier 139 that uniquely identifies the table 129 with respect to other tables 129. Each table 129 can also include table data 146, which could represent a subset of the warehouse data 133 loaded from the data warehouse 109 into the table 129.

The warehouse data 133 can represent data sourced from a variety of databases, services, applications, or third parties. The warehouse data 133 can be stored in a variety of formats depending on the source of the data, such as tables, key-value pairs, trees, or other data structures.

The metadata 136 can represent information about the warehouse data 133. This can include information such as the names of individual tables, key-value pairs, trees, etc. It can also include information about the data stored in the individual data structures, such as the names of individual columns of a table, the type of data stored in individual columns of a table (e.g., integer data, floating point data, character data, Boolean values, binary large objects (BLOBs), etc.), the number of rows in a table, the type of key used for a key-value pair (e.g., numeric value key, character string value key, etc.), as well as various other types of data about the warehouse data 133 that could be relevant for specific implementations of the present disclosure.

The client device 106 is representative of a plurality of client devices that can be coupled to the network 113. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 149, such as liquid crystal displays (LCDs), gas plasma-based flat panel displays, organic light emitting diode (OLED) displays, electrophoretic ink ("E-ink") displays, projectors, or other types of display devices. In some instances, the display 149 can be a component of the client device 106 or can be connected to the client device 106 through a wired or wireless connection.

The client device 106 can be configured to execute various applications such as a client application 153 or other applications. The client application 153 can be executed in a client device 106 to access network content served up by the computing environment 103 or other servers, thereby rendering a user interface 156 on the display 149. To this end, the client application 153 can include a browser, a dedicated application, or other executable, and the user interface 156 can include a network page, an application screen, or other user mechanism for obtaining user input. The client device 106 can be configured to execute applications beyond the client application 153 such as email applications, social networking applications, word processors, spreadsheets, or other applications.

Next, a general description of the operation of the various components of the network environment 100 is provided. Although the following general description provides an example of the interactions between the various components of the network environment 100, other interactions between the various components of the network environment 100 are also possible according to various embodiments of the present disclosure.

To begin, the data processing service 116 can receive metadata 136 about the warehouse data 133. For example, the data processing service 116 could send a request to the data warehouse 109 for the metadata 136, which could be returned by the data warehouse 109. However, the metadata 136 could be obtained using other approaches. For example, the metadata 136 could be manually entered by a user or uploaded by the user from the outset. The data processing service 116 can then store or cache the metadata 136 for future use by the data processing service 116.

Next, the data processing service 116 can send a request to the data warehouse 109 for profile data 123. In some instances, the request can specify the types of profile data 123 to be returned by the data warehouse 109. In some instances, the request can specify the columns or tables to be profiled. Moreover, it should be noted that the data processing service 116 can request profile data 123 from the data warehouse 109 at periodic intervals (e.g., daily, weekly, monthly, etc.), or on-demand, in order to maintain an up-to-date profile of the warehouse data 133 stored in the data warehouse 109.

In response each request, the data warehouse 109 can analyze the warehouse data 133 and return the requested profile data 123. By have the data warehouse 109 evaluate the warehouse data 133 to generate the profile data 123 and return the profile data 123 to the data processing service 116, network bandwidth is conserved in comparison to transferring the warehouse data 133 to the data processing service 116 for profiling.

The data processing service 116 can also receive a request to load warehouse data 133, or a subset of the warehouse data 133, from the data warehouse 109 into a table 129 in the data store 119. For example, an application may require warehouse data 133 from the data warehouse 109 to be loaded into a table 129 in order to perform some task. As another example, a data scientist may request warehouse data 133 from the data warehouse 109 in order to perform data analysis for a task. In another example, warehouse data 133 could be loaded from the data warehouse 109 into a table 129 for the purpose of training a machine-learning model.

To ensure that the warehouse data 133 requested from the data warehouse 109 is fit for the intended purpose, the data processing service 116 can evaluate one or more previously specified validation rules 126 associated with the table 129. In some implementations, the validation rules 126 could be evaluated before the requested warehouse data 133 is transferred from the data warehouse 109 to the table 129 in order to avoid consuming network 113 bandwidth or storage space for the data store 119 in the event that the warehouse data 133 fails to satisfy or comply with the validation rules 126 for the table 129. However, in other implementations, the validation rules 126 could be evaluated after the requested warehouse data 133 is transferred from the data warehouse 109 to table 129 in order to confirm that the warehouse data 133 in the table 129 remains fit for its intended purpose. This could be done, for example, to allow for additional validation rules 126 to be created and evaluated during or after the transfer from the data warehouse 109 to the table 129. If the validation rules 126 are satisfied, then the program or use can make use of the data in the table 129. However, if one or more validation rules 126 are unsatisfied or the warehouse data 133 otherwise fails to comply with one or more validation rules 126, then the data processing service 116 can send an alert, notification, or other message to a predefined recipient.

Figure 2:
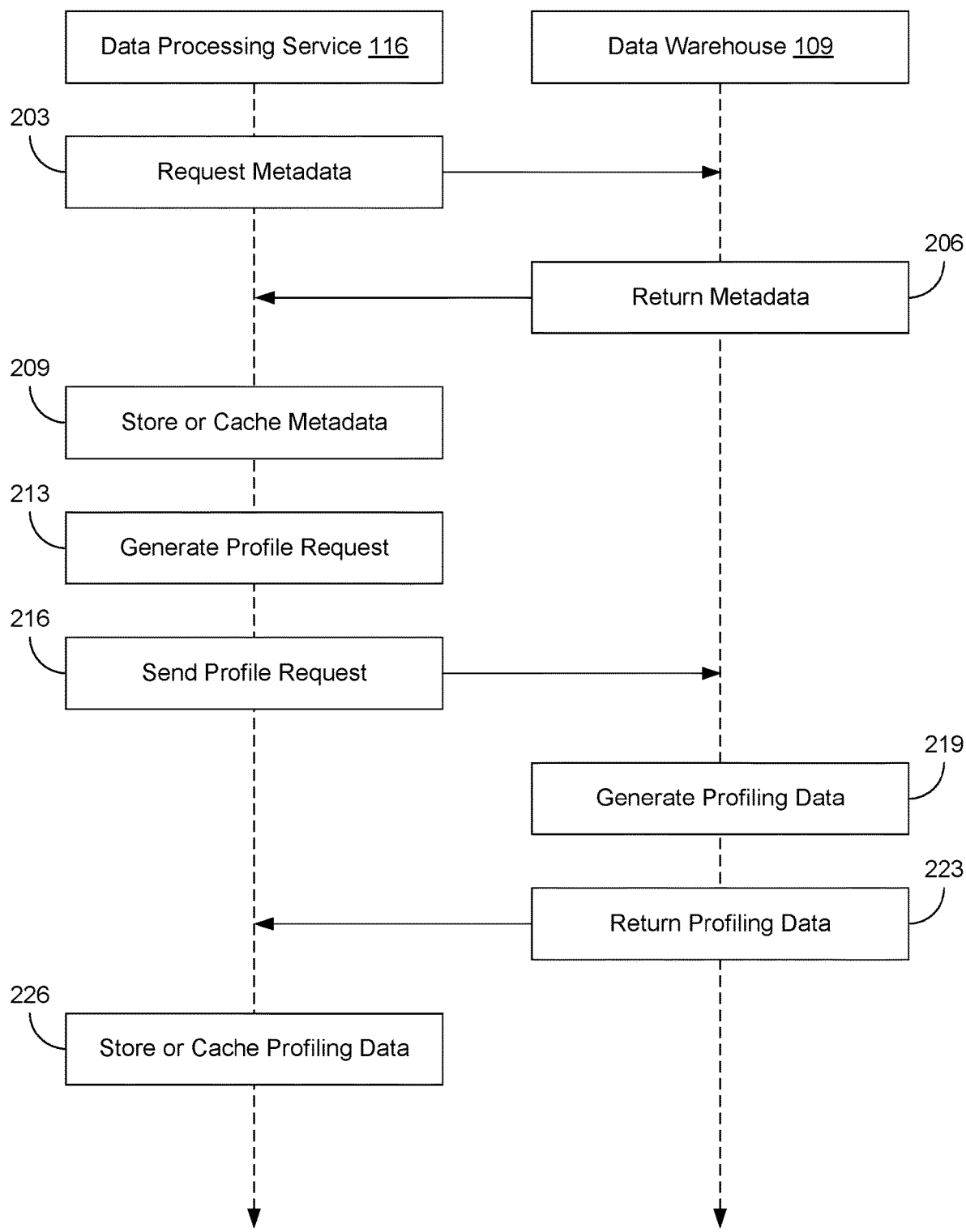
FIG. 2 is a flowchart illustrating one example of functionality implemented as portions of an application executed in a computing environment in the network environment of FIG. 1 according to various embodiments of the present disclosure.

Referring next to FIG. 2, shown is a sequence diagram that provides one example of the interactions between the data processing service 116 and the data warehouse 109. The sequence diagram of FIG. 2 provides merely an example of the many different types of functional arrangements that can be employed to implement the depicted interactions between the data processing service 116 and the data warehouse 109. As an alternative, the sequence diagram of FIG. 2 can be viewed as depicting an example of elements of a method implemented within the network environment 100.

Beginning with block 203, the data processing service 116 can send a request to the data warehouse 109 for metadata 136 associated with the warehouse data 133 stored in the data warehouse 109.

Then, at block 206, the data warehouse 109 can return the metadata 136 for the warehouse data 133 stored in the data warehouse 109.

The data processing service 116 can then store or cache the metadata 136 for future use at block 209, such as for the creation of new or customized validation rules 126.

Later, at block 213, the data processing service 116 can generate a request for profile data 123. The request can be based at least in part on the metadata 136 received at block 206 and stored at block 209. For example, for each column identified in the metadata 136, the data processing service 116 could specify the profile data 123 to be provided by the data warehouse 109. For instance, the data processing service 116 could request the fill rate for each column identified in the metadata 136, but only request the mean, median, mode, and variance of columns identified in the metadata 136 as containing numeric values (e.g., integer values, floating point values, etc.). For other types of columns, such as columns identified in the metadata 136 as containing characters or strings, the data processing service 116 could request similar statistics such as the mean, median, and mode number of characters for each entry in the column. Other profile data could be requested for other types of types of columns as appropriate. The request could be formatted as a structured query language (SQL) query, although other embodiments of the present disclosure could use other approaches.

Once the query is generated at block 213, the data processing service 116 could then send the request to the data warehouse at block 216. The data processing service 116 could then wait until it receives a response to the request from the data warehouse 109.

In response to receiving the request from the data processing service 116, the data warehouse 109 can generate or compile the requested profile data at block 219. For example, the data warehouse 109 could calculate the fill rate for columns identified in the data processing request. As another example, the data warehouse 109 could also calculate the mean, median, mode, and variance of columns specified in the request in the manner specified. Other profile data 123 could also be calculated or generated as specified in the request.

Once the data warehouse 109 generates the requested profile data 123, the data warehouse 109 can then return the requested profile data 123 to the data processing service 116 at block 223.

In response to receiving the profile data 123, the data processing service 116 can store the profile data 123 in the data store 119 for future use.

Figure 3:
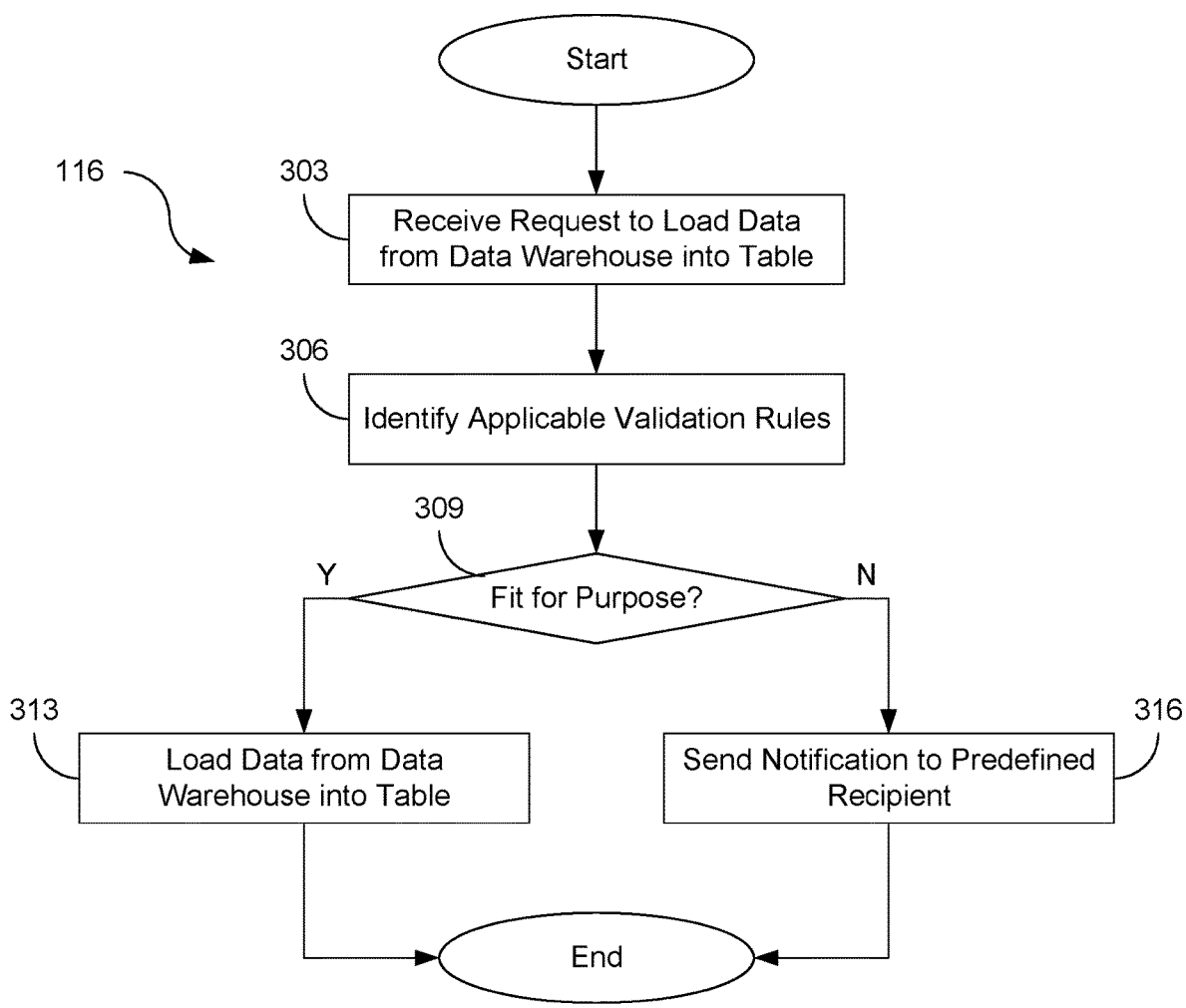
FIG. 3 is a sequence diagram illustrating the interactions between portions of the network environment of FIG. 1 according to various embodiments of the present disclosure.

Referring next to FIG. 3, shown is a flowchart that provides one example of the operations of the data processing service 116. The flowchart of FIG. 3 provides merely an example of the many different types of functional arrangements that can be employed to implement the depicted operations of the data processing service 116. As an alternative, the flowchart of FIG. 3 can be viewed as depicting an example of elements of a method implemented within the network environment 100.

Beginning with block 303, the data processing service 116 can receive a request to load data from the data warehouse 109 into a table 129 in the data store 119. The request can include information such as the table identifier 139 of the table 129 into which the data is to be loaded, as well as which elements of the warehouse data 133 in the data warehouse 109 (e.g., which rows, columns, tables, key-value pairs, etc.) are to be loaded into the table 129. The elements of the warehouse data 133 in the data warehouse 109 could be specified by a SQL query or other identifying query.

The request could be received from any of a variety of sources. For example, another application executing in the computing environment 100 could send the request to the data processing service 116 (e.g., a request from an application or service to load data in order to perform one or more functions). As another example, an application executing on the client device 106 could have submitted the request to the data processing service 116 (e.g., a request from a data analyst in order to analyze data).

Then, at block 306, the data processing service 116 can identify one or more validation rules 126 to use to determine if the requested data is fit for the purpose associated with the table 129. Accordingly, the data processing service 116 can use the table identifier 139 associated with the destination table 129, which could have been included in the request received at block 303, to search for one or more validation rules 126 with matching table identifier 139.

Next, at block 309, the data processing service 116 can evaluate the validation rules 126 identified at block 306 to determine whether the requested data stored in the data warehouse 109 is fit for its intended use or purpose. This can be done by evaluating each of the specified validation rules 126 and determining, based at least in part on the profile data 123, whether the requested warehouse data 133 from the data warehouse 109 would satisfy the evaluation criteria 143 specified in each validation rule 126. The profile data 123 for the warehouse data 133 stored in the data warehouse 109 would be evaluated prior to loading the requested warehouse data 133 from the data warehouse 109 into the table 129 in order preserve network 113 bandwidth and storage space allocated to the data store 119. If the requested warehouse data 133 in the data warehouse 109 satisfies all of the validation rules 126 identified at block 306, then the process can proceed to block 313. However, if the requested warehouse data 133 in the data warehouse 109 fails to comply with or satisfy at least one validation rule 126, and therefore was unfit for its intended purpose, then the transfer of the requested warehouse data 133 from the data warehouse 109 would be avoided. Instead, the process could proceed to block 316.

For example, if a validation rule 126 specifies that the table 129 has to have at least a ninety-nine percent (99%) fill rate on the first, second, and third columns, then the data processing service 116 could analyze the profile data 123 associated with the warehouse data 133 in the data warehouse 109 that would be loaded into the first, second, and third columns of the table 129 to determine if those columns would have at least a ninety-nine (99%) percent fill rate. As another example, if a validation rule 126 specifies that ninety-five percent (95%) of the values in the fourth column of the table 129 should be within two standard deviations, then the data processing serviced 116 could analyze the profile data 123 associated with the warehouse data 133 in the data warehouse 109 that would be loaded into the fourth column of the table 129 to determine if ninety-five percent (95%) of the values in the fourth column of the table 129 would be within two standard deviations. It should be noted that there are illustrative examples only and the data processing service 116 could evaluate the profile data 123 associated with the warehouse data 133 in the data warehouse 109 that would be loaded into the table 129 for compliance with any type of evaluation criteria 143 specified in a validation rule 126.

If the process proceeds to block 313, then the data processing service 116 can initiate a transfer of the requested warehouse data 133 from the data warehouse 109. For example, the data processing service 116 could submit the query included in the request received at block 303 to the data warehouse 109. In response, the data processing service 116 could receive the requested warehouse data 133 and load it into the table 129 specified by the table identifier 139 included in request received at block 303. Once the data is completely loaded into the table 129, the depicted process could end.

However, if the process proceeds to block 316, then the data processing service 116 can instead send a notification to a predefined recipient alerting the recipient that the warehouse data 133 in the data warehouse 109 fails to satisfy one or more validation rules 126 and is therefore unfit for the purposes of the table 129. A predefined recipient could be identified in each validation rule 126, in which case the data processing service 116 could send the notification to the recipient specified in the validation rule 126. If the warehouse data 133 failed to comply with multiple validation rules 126 with different predefined recipients, then multiple notifications could be sent. Moreover, by alerting the predefined recipients of the failure of the validation rule(s) 126 instead of copying the requested warehouse data 133 from the data warehouse 109, the data processing service 116 can avoid consuming network 113 bandwidth or storage for the data store 119. Once the notifications are sent, the process can end.

Figure 4:
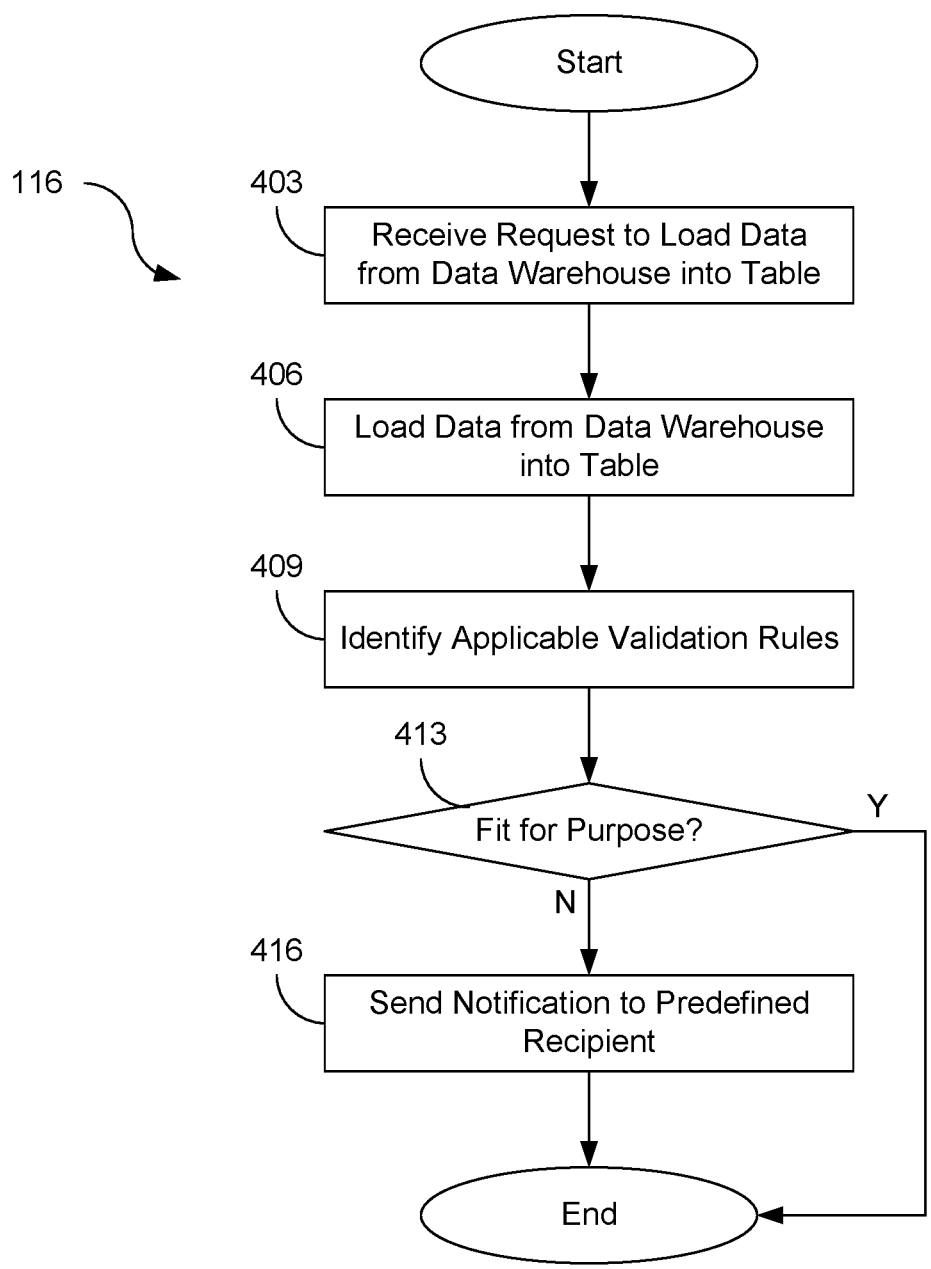
FIG. 4 is a sequence diagram illustrating the interactions between portions of the network environment of FIG. 1 according to various embodiments of the present disclosure.

Referring next to FIG. 4, shown is a flowchart that provides one example of the operations of the data processing service 116. The flowchart of FIG. 4 provides merely an example of the many different types of functional arrangements that can be employed to implement the depicted operations of the data processing service 116. As an alternative, the flowchart of FIG. 4 can be viewed as depicting an example of elements of a method implemented within the network environment 100.

Beginning with block 403, the data processing service 116 can receive a request to load data from the data warehouse 109 into a table 129 in the data store 119. The request can include information such as the table identifier 139 of the table 129 into which the data is to be loaded, as well as which elements of the warehouse data 133 in the data warehouse 109 (e.g., which rows, columns, tables, key-value pairs, etc.) are to be loaded into the table 129. The elements of the warehouse data 133 in the data warehouse 109 could be specified by a SQL query or other identifying query.

The request could be received from any of a variety of sources. For example, another application executing in the computing environment 100 could send the request to the data processing service 116 (e.g., a request from an application or service to load data in order to perform one or more functions). As another example, an application executing on the client device 106 could have submitted the request to the data processing service 116 (e.g., a request from a data analyst in order to analyze data).

Next, at block 406, the data processing service 116 can initiate a transfer of the requested warehouse data 133 from the data warehouse 109. For example, the data processing service 116 could submit the query included in the request received at block 403 to the data warehouse 109. In response, the data processing service 116 could receive the requested warehouse data 133 and load it into the table 129 specified by the table identifier 139 included in request received at block 403.

After the data has been received and stored in the table 129, then, at block 409, the data processing service 116 can identify one or more validation rules 126 to use to determine if the requested data is fit for the purpose associated with the table 129. Accordingly, the data processing service 116 can use the table identifier 139 associated with the destination table 129, which could have been included in the request received at block 403, to search for one or more validation rules 126 with matching table identifier 139.

Moving on to block 413, the data processing service 116 can evaluate the validation rules 126 identified at block 409 to determine whether the requested data stored in the data warehouse 109 is fit for its intended use or purpose. This can be done by evaluating each of the specified validation rules 126 and determining, based at least in part on the profile data 123, whether the data loaded into the table 129 satisfies the evaluation criteria 143 specified in each validation rule 126. For example, if a validation rule 126 specifies that the table 129 has to have at least a ninety-nine percent (99%) fill rate on the first, second, and third columns, then the data processing service 116 could analyze the profile data 123 associated with the warehouse data 133 in the data warehouse 109 that was loaded into the first, second, and third columns of the table 129 to determine if those columns have at least a ninety-nine (99%) percent fill rate. As another example, if a validation rule 126 specifies that ninety-five percent (95%) of the values in the fourth column of the table 129 should be within two standard deviations, then the data processing serviced 116 could analyze the profile data 123 associated with the warehouse data 133 in the data warehouse 109 that was loaded into the fourth column of the table 129 to determine if ninety-five percent (95%) of the values in the fourth column of the table 129 would be within two standard deviations. It should be noted that there are illustrative examples only and the data processing service 116 could evaluate the profile data 123 associated with the warehouse data 133 in the data warehouse 109 that was be loaded into the table 129 for compliance with any type of evaluation criteria 143 specified in a validation rule 126. Moreover, it should be noted that the table 129 itself could be evaluated after the warehouse data 133 from the data warehouse 109 has been loaded into the table 129. However, it will often be quicker to the profile data 123 to determine compliance with the evaluation criteria 143 of each validation rule 126 than it would be to execute a database query against the table 129, especially since the table 129 could contain voluminous amounts of data and each query could take a substantial amount of time to complete and require substantial computing resources compare to a simpler evaluation of the profile data 123 that has already been obtained from the data warehouse 109. If all of the validation rules 126 are satisfied, then the process can end. However, if the warehouse data 133 loaded from the data warehouse 109 into the table 129 fails to comply with or satisfy at least one applicable validation rule 126, then the process can proceed to block 416.

Subsequently, at block 416, the data processing service 116 can send a notification to a predefined recipient alerting the recipient that the warehouse data 133 load from the data warehouse 109 into the table 129 fails to satisfy one or more validation rules 126 and is therefore unfit for the purposes of the table 129. A predefined recipient could be identified in each validation rule 126, in which case the data processing service 116 could send the notification to the recipient specified in the validation rule 126. If the warehouse data 133 failed to comply with multiple validation rules 126 with different predefined recipients, then multiple notifications could be sent. Once the notifications are sent, the process can end.

Figures 5C, 5D:
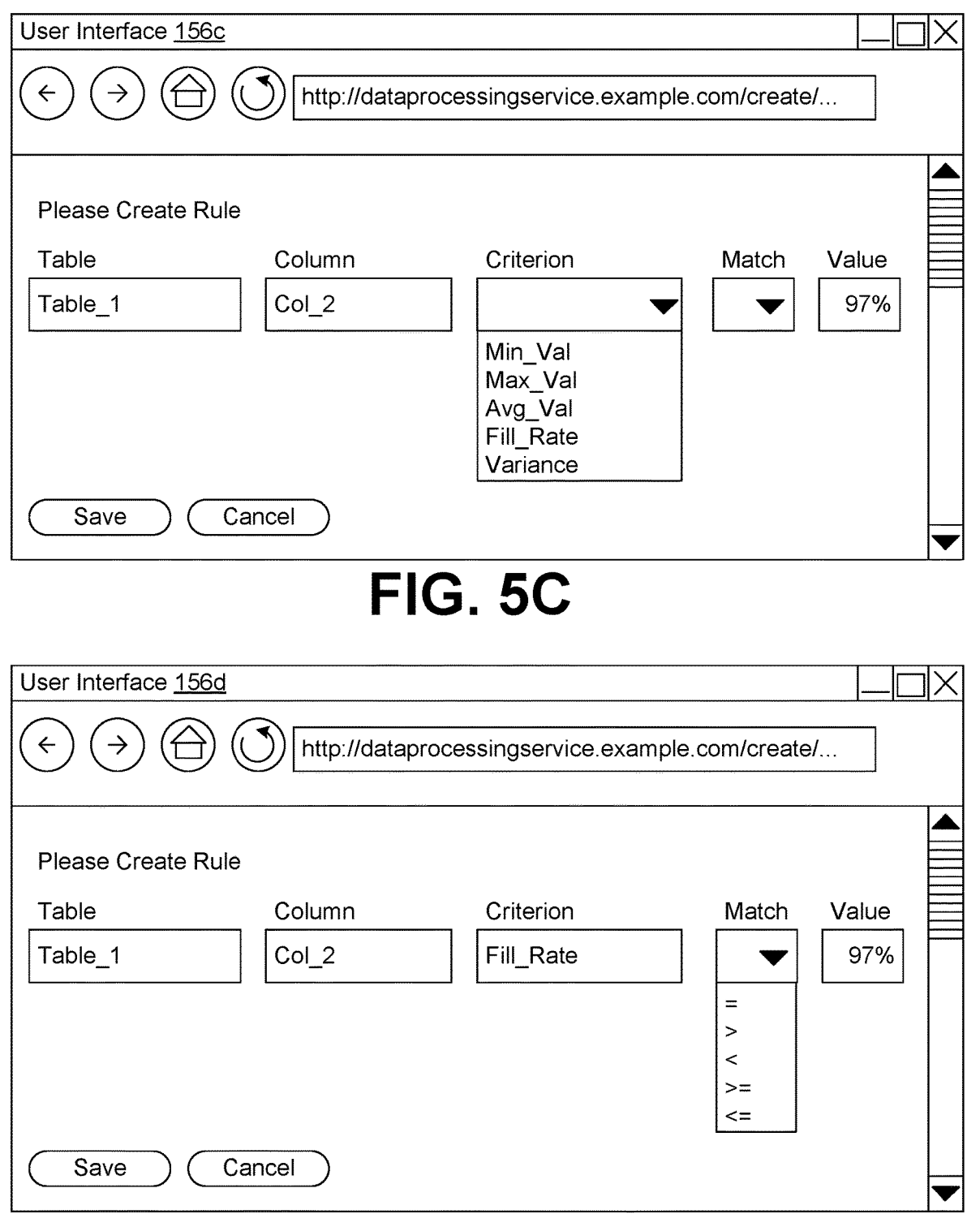

FIGS. 5A-5B depict examples of a user interface 156 presented on the display 149 of the client device 106 according to various embodiments of the present disclosure. The user interfaces 156 of FIGS. 5A-D illustrate one example of how a user could create a validation rule 126 for a table 129 using predefined options based at least in part on the metadata 136 of the warehouse data 133 stored in the data warehouse 109. Other user interfaces with a different look and feel, but the same or similar functionality, could be used by the various embodiments of the present disclosure.

In FIG. 5A, a user could interact with user interface 156a to select a table 129 from a list of existing tables 129 identified by the data processing service 116. Within the user interface 156b of FIG. 5B, the user could then select a column of the table 129 selected using the interface 156a to which the validation rule 126 would apply. Then, within the user interface 156c of FIG. 5B, the user could select an evaluation criterion 143 for the selected column from a list of predefined or commonly used evaluation criterion 143. Next, within the user interface 156d of FIG. 5D, the user could specify how the selected evaluation criterion 143 should be evaluated and the value to be used for the evaluation (e.g., fill rate greater than 97%). The user could then save their selections to create a validation rule 126 for the table 129. Although the user interfaces 156 of FIGS. 5A-5D depicts a user selecting a single evaluation criterion 143 for a single column of a table 129, other embodiments could use a similar user interface 156 to select multiple evaluation criterion for a validation rule 126 for a table 129.

FIGS. 6A and 6B depict examples of a user interface 156 presented on the display 149 of the client device 106 according to various embodiments of the present disclosure. The user interfaces 156 of FIG. 6A and FIG. 6B illustrate one example of how a user could create a validation rule 126 with a customized evaluation criterion 143 for use in the various embodiments of the present disclosure. Other user interfaces with a different look and feel, but the same or similar functionality, could be used by the various embodiments of the present disclosure.

In FIG. 6A, a user could interact with the user interface 156e to select a table 129 from a list of existing tables 129 identified by the data processing service 116. Then, within the user interface 156f of FIG. 6B, the user could enter custom expression logic or code (e.g., a database query such as a SQL query) that could be evaluated or executed by the data processing service 116 to determine if the warehouse data 133 from the data warehouse 109 is fit for the purpose of the table 129.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
   generate a query for profile data for data stored in a data warehouse, wherein the query is generated based at least in part on metadata for the data stored in the data warehouse;
   send the query for the profile data to the data warehouse;
   receive the profile data from the data warehouse; and
   in response to a request to load the data stored in the data warehouse into a table in a data store, determine whether the data stored in the data warehouse complies with a validation rule that is based at least in part on the profile data, wherein the validation rule is associated with an intended use for the data stored in the data warehouse, and wherein the validation rule is selected based on a table identifier associated with the table into which the data can be loaded, wherein the validation rule specifies one or more evaluation criteria including at least a fill rate threshold, a minimum or maximum value constraint, or a deviation-based requirement.

2. The system of claim 1, wherein the machine-readable instructions further cause the computing device to at least load the data stored in the data warehouse into the table in the data store in response to a determination that the data stored in the data warehouse complies with the validation rule.

3. The system of claim 1, wherein the machine-readable instructions further cause the computing device to at least send an alert to a predefined recipient in response to a determination that the data stored in the data warehouse fails to comply with the validation rule.

4. The system of claim 1, wherein a determination whether the data stored in the data warehouse complies with the validation rule is made subsequent to the data stored in the data warehouse being loaded into the table in the data store.

5. The system of claim 1, wherein the machine-readable instructions further cause the computing device to at least:
   send to the data warehouse a request for metadata associated with the data stored in the data warehouse;
   receive from the data warehouse the metadata associated with the data stored in the data warehouse; and
   wherein the query for the profile data is generated based at least in part on the metadata received from the data warehouse.

6. The system of claim 1, wherein the machine-readable instructions further cause the computing device to at least:
   provide a user interface to allow a user to customize the validation rule; and
   obtain through the user interface a customization of the validation rule.

7. The system of claim 6, wherein the customization comprises an expression that can evaluated by the machine-readable instructions to determine whether the data stored in the data warehouse complies with the validation rule.

8. A method, comprising:
   generating a query for profile data for data stored in a data warehouse wherein the query is generated based at least in part on metadata for the data stored in the data warehouse;
   sending the query for the profile data to the data warehouse;
   receiving the profile data from the data warehouse; and
   in response to a request to load the data stored in the data warehouse into a table in a data store, determining whether the data stored in the data warehouse complies with a validation rule that is based at least in part on the profile data, wherein the validation rule is associated with an intended use for the data stored in the data warehouse, and wherein the validation rule is selected based on a table identifier associated with the table into which the data can be loaded, wherein the validation rule specifies one or more evaluation criteria including at least a fill rate threshold, a minimum or maximum value constraint, or a deviation-based requirement.

9. The method of claim 8, further comprising loading the data stored in the data warehouse into the table in the data store in response to a determination that the data stored in the data warehouse complies with the validation rule.

10. The method of claim 8, further comprising sending an alert to a predefined recipient in response to a determination that the data stored in the data warehouse fails to comply with the validation rule.

11. The method of claim 8, wherein determining whether the data stored in the data warehouse complies with the validation rule is made subsequent to the data stored in the data warehouse being loaded into the table in the data store.

12. The method of claim 8, further comprising:
   sending to the data warehouse a request for metadata associated with the data stored in the data warehouse;
   receiving from the data warehouse the metadata associated with the data stored in the data warehouse; and
   wherein the query for the profile data is generated based at least in part on the metadata received from the data warehouse.

13. The method of claim 8, further comprising:
   providing a user interface to allow a user to customize the validation rule; and
   obtaining through the user interface a customization of the validation rule.

14. The method of claim 13, wherein the customization comprises an expression that can evaluated by the machine-readable instructions to determine whether the data stored in the data warehouse complies with the validation rule.

15. A non-transitory, computer-readable medium, comprising machine-readable instructions that, when executed by a processor of a computing device, cause the computing device to at least:
generate a query for profile data for data stored in a data warehouse, wherein the query is generated based at least in part on metadata for the data stored in the data warehouse;
send the query for the profile data to the data warehouse;
receive the profile data from the data warehouse; and
in response to a request to load the data stored in the data warehouse into a table in a data store, determine whether the data stored in the data warehouse complies with a validation rule that is based at least in part on the profile data, wherein the validation rule is associated with an intended use for the data stored in the data warehouse, and wherein the validation rule is selected based on a table identifier associated with the table into which the data can be loaded, wherein the validation rule specifies one or more evaluation criteria including at least a fill rate threshold, a minimum or maximum value constraint, or a deviation-based requirement.

16. The non-transitory, computer-readable medium of claim 15, wherein the machine-readable instructions further cause the computing device to at least load the data stored in the data warehouse into the table in the data store in response to a determination that the data stored in the data warehouse complies with the validation rule.

17. The non-transitory, computer-readable medium of claim 15, wherein the machine-readable instructions further cause the computing device to at least send an alert to a predefined recipient in response to a determination that the data stored in the data warehouse fails to comply with the validation rule.

18. The non-transitory, computer-readable medium of claim 15, wherein a determination whether the data stored in the data warehouse complies with the validation rule is made subsequent to the data stored in the data warehouse being loaded into the table in the data store.

19. The non-transitory, computer-readable medium of claim 15, wherein the machine-readable instructions further cause the computing device to at least:
send to the data warehouse a request for metadata associated with the data stored in the data warehouse;
receive from the data warehouse the metadata associated with the data stored in the data warehouse; and
wherein the query for the profile data is generated based at least in part on the metadata received from the data warehouse.

20. The non-transitory, computer-readable medium of claim 15, wherein the machine-readable instructions further cause the computing device to at least:
provide a user interface to allow a user to customize the validation rule; and
obtain through the user interface a customization of the validation rule.

* * * * *